(12) United States Patent
Lim et al.

(10) Patent No.: US 7,489,380 B2
(45) Date of Patent: Feb. 10, 2009

(54) THIN FILM TRANSISTOR SUBSTRATE OF HORIZONTAL ELECTRIC FIELD APPLYING TYPE AND FABRICATING METHOD THEREOF

(75) Inventors: Byoung Ho Lim, Gyeongsangbuk-do (KR); Bo Ram Kim, Seoul (KR); Jin Ho Kim, Gyeonggi-do (KR)

(73) Assignee: LG. Display Co., Ltd., Seoul (KR)

( * ) Notice: Subject to any disclaimer, the term of this patent is extended or adjusted under 35 U.S.C. 154(b) by 102 days.

(21) Appl. No.: 11/645,380

(22) Filed: Dec. 26, 2006

(65) Prior Publication Data

US 2008/0002126 A1    Jan. 3, 2008

(30) Foreign Application Priority Data

Jun. 30, 2006    (KR) .................. 10-2006-0060491

(51) Int. Cl.
G02F 1/1343    (2006.01)
(52) U.S. Cl. ..................................... 349/141
(58) Field of Classification Search .............. 349/141
See application file for complete search history.

(56) References Cited

U.S. PATENT DOCUMENTS 7,292,302 B2 *    11/2007    Min et al. ............ 349/141

2005/0231676 A1 *    10/2005    Lin et al. ............ 349/141

FOREIGN PATENT DOCUMENTS

JP    2005-173536    6/2005

OTHER PUBLICATIONS

Office Action issued in corresponding Chinese Patent Application No. 2006101705147; issued Aug. 22, 2008.

* cited by examiner

*Primary Examiner*—David Nelms
*Assistant Examiner*—Phu Vu
(74) *Attorney, Agent, or Firm*—Brinks Hofer Gilson & Lione

(57) ABSTRACT

A thin film transistor substrate comprises a gate line disposed on a substrate, a data line that crosses the gate line with a gate insulating film therebetween to define a pixel area, and a thin film transistor connected to the gate line and the data line. The thin film transistor substrate of a horizontal electric field applying type further comprises a pixel electrode plate connected to the thin film transistor, a protective film disposed to cover the data line, the thin film transistor and the pixel electrode plate on the gate insulating film, and a common electrode disposed at an array area provided with the thin film transistor array and disposed in a mesh shape on the protective film.

21 Claims, 15 Drawing Sheets

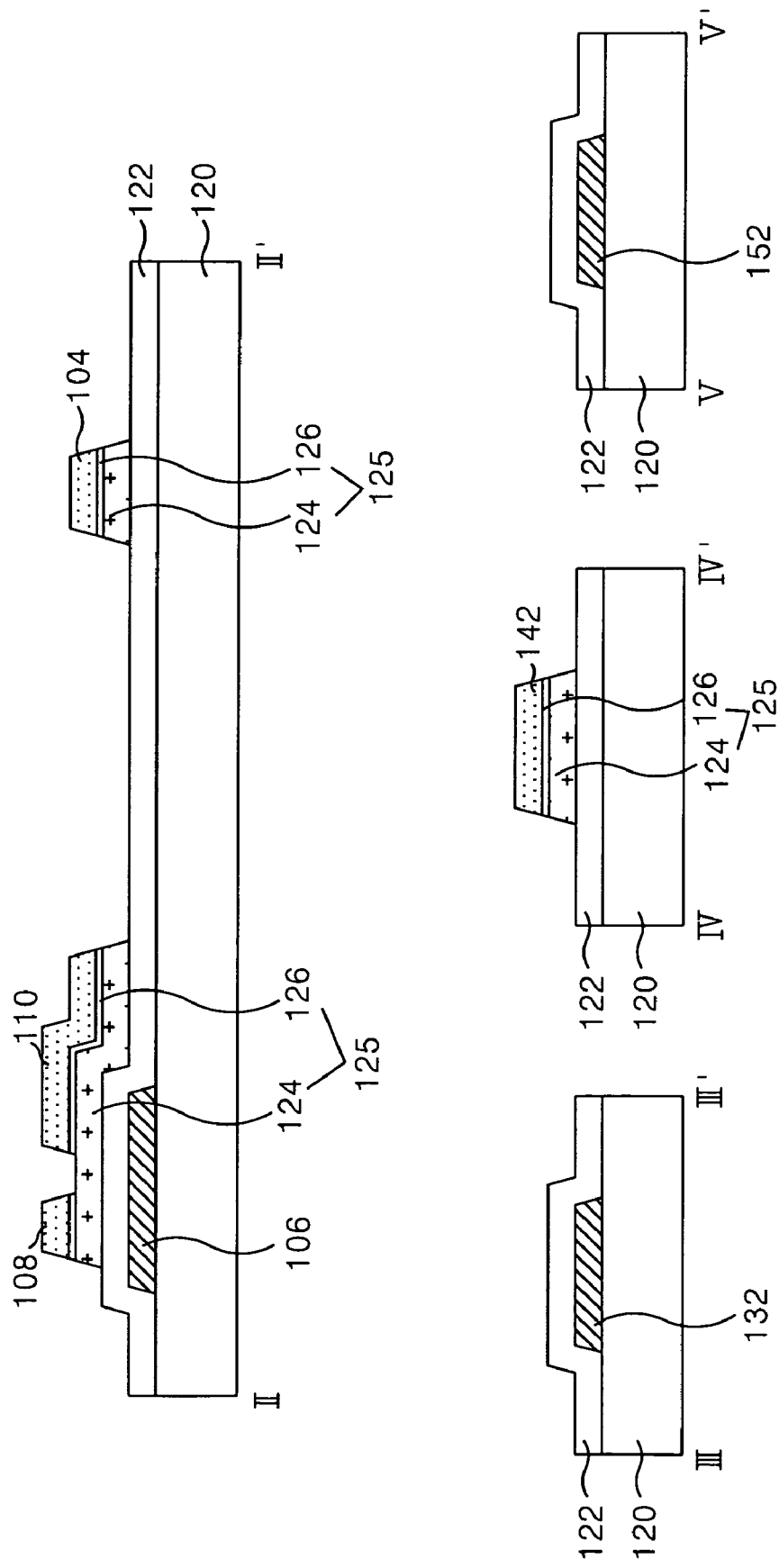

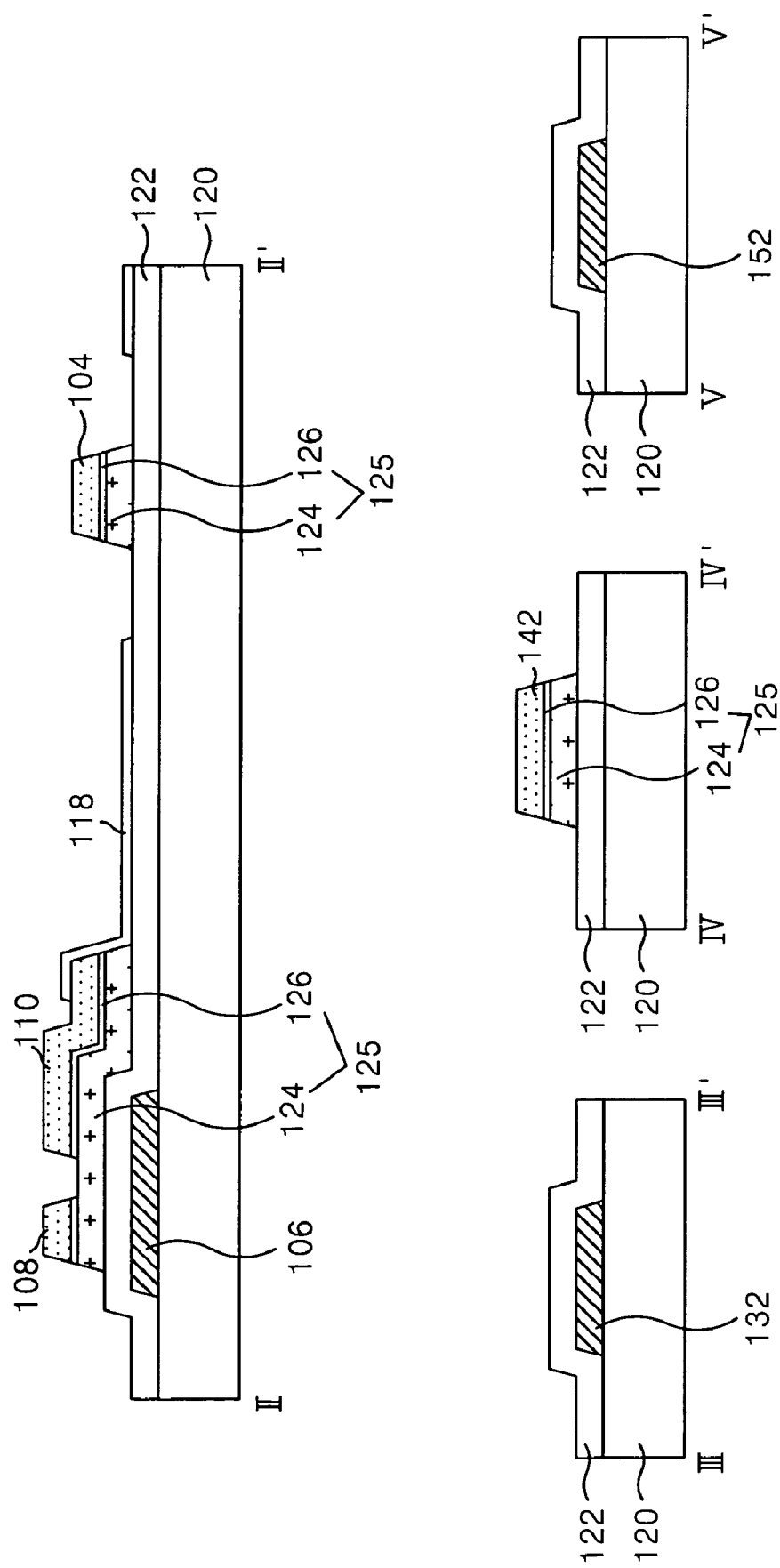

THIN FILM TRANSISTOR SUBSTRATE OF HORIZONTAL ELECTRIC FIELD APPLYING TYPE AND FABRICATING METHOD THEREOF

This application claims the benefit of Korean Patent Application No. P06-0060491 filed in Korea on Jun. 30, 2006, which is herein incorporated by reference.

FIELD

The present invention relates to a liquid crystal display device of a horizontal electric field applying type, and more particularly to a thin film transistor substrate of a horizontal electric field applying type and a fabricating method thereof having a high aperture ratio. Further, the present invention relates to a thin film transistor substrate of a horizontal electric field applying type and a fabricating method thereof that are adaptive for having a high aperture ratio and maintaining adequately a capacitance value of a storage capacitor.

BACKGROUND

A liquid crystal display device controls a light transmittance of a liquid crystal using an electric field to thereby display a picture. The liquid crystal display device is largely classified into a vertical electric field applying type and a horizontal electric field applying type depending upon a direction of the electric field driving the liquid crystal.

The liquid crystal display device of a vertical electric field applying type drives a liquid crystal in a TN (Twisted Nematic) mode with a vertical electric field formed between a pixel electrode and a common electrode arranged in opposition to each other on the upper and lower substrates. The liquid crystal display device of a vertical electric field applying type has an advantage of a large aperture ratio but has a drawback of a narrow viewing angle of about 90°.

The liquid crystal display device of a horizontal electric field applying type drives a liquid crystal in an In Plane Switching (hereinafter, referred to as "IPS") mode with a horizontal electric field between the pixel electrode and the common electrode arranged in parallel to each other on the lower substrate. The liquid crystal display device of the IPS mode has an advantage of a wide viewing angle of about 160°, but has a disadvantage of low aperture ratio and transmittance. Specifically, in order to provide an In Plane Field in the liquid crystal display device of the IPS mode, a distance between the common electrode and the pixel electrode for driving the liquid crystal is wider than a distance between the upper substrate and the lower substrate. In order to obtain an electric field having an adequate intensity, the common electrode and the pixel electrode in the liquid crystal display device of the IPS mode have a wide width. An electric field parallel to the substrate is formed between the pixel electrode and the common electrode of the IPS mode, but the electric field does not affect the liquid crystal in the upper pixel electrodes and the upper common electrodes portion. Accordingly, the liquid crystal in the upper pixel electrodes and the upper common electrodes portion is not driven by the electric field and maintains an initial state. As a result, the liquid crystal in the initial state does not transmit light and thus an aperture ratio and the light transmittance of the IPS mode liquid crystal display device are reduced.

Recently, in order to overcome the disadvantage of the liquid crystal display device of the IPS mode, there has been suggested a liquid crystal display device of a fringe field switching (hereinafter, referred to as "FFS") type operated by a fringe field. The FFS-type liquid crystal display device includes a common electrode plate and a pixel electrode with an insulating film therebetween at each pixel area. A distance between the common electrode plate and the pixel electrode in the FFS-type liquid crystal display device is wider than a distance between the upper substrate and the lower substrate such that a fringe field of parabolic shape is provided at an upper portion of the common electrode and the pixel electrode. And, the liquid crystal molecules filled between the upper substrate and the lower substrate are all driven by the fringe field, thus the aperture ratio and the light transmittance in the FFS-type liquid crystal display device are improved.

FIG. 1 is a plan view illustrating a thin film transistor substrate included in a related art FFS-type liquid crystal display device, and FIG. 2 is a sectional view of the thin film transistor substrate taken along the I-I' line in FIG. 1.

Referring to FIG. 1 and FIG. 2, a thin film transistor substrate includes a gate line 2 and a data line 4 that cross each other with a gate insulating film 22 therebetween on a lower substrate 20, and a thin film transistor is provided for each intersection. A pixel area on a thin film transistor substrate is defined by an intersection of the gate line 2 and the data line 4. A common electrode plate 14 and a pixel electrode slit 18 with the gate insulating film 22 and a protective film 28 therebetween are mounted at the pixel area to provide the fringe field F. The common electrode plate 14 is connected to a common line 1 parallel to the gate line 2. Herein, the gate insulating film 22 and the protective film 28 are made from an inorganic insulating material such as $SiN_x$, etc., and have a thickness of about 2000 Å.

The common electrode plate 14 is supplied, via the common line 1 connected to the common electrode plate 14, with a reference voltage (hereinafter, common voltage) for driving the liquid crystal. The common electrode plate 14 comprises a transparent conductive layer, and the common line 1 comprises a gate metal layer along with the gate line 2.

The thin film transistor TFT allows a pixel signal applied to the data line 4 to be charged into the pixel electrode slit 18 and be maintained in response to a gate signal applied to the gate line 2. To this end, the thin film transistor TFT includes a gate electrode 6 connected to the gate line, a source electrode 8 connected to the data line 4, a drain electrode 10 connected to the pixel electrode slit 18, an active layer 24 overlapping with the gate electrode 6 with the gate insulating film 22 therebetween to provide a channel between the source electrode 8 and the drain electrode 10, and a semiconductor pattern 25 including an ohmic contact layer 26 for making an ohmic contact with the source electrode 8, the drain electrode 10 and the active layer 24.

The pixel electrode slit 18 is connected, via a contact hole 12 passing through the protective film 28, to the drain electrode 10 of the thin film transistor TFT, and overlaps the common electrode plate 14. The pixel electrode slit 18 forms an electric field together with the common electrode plate 14 to rotate the liquid crystal molecules arranged in a horizontal direction between the thin film transistor substrate and the color filter substrate due to a dielectric anisotropy. Transmittance of a light transmitting the pixel area is differentiated according to a rotation extent of the liquid crystal molecules, thereby implementing a gray level scale.

The electric field formed between the common electrode plate 14 and the pixel electrode slit 18 includes both a linear-type electric field and a fringe field F of parabolic shaped curvature. A start point and an end point of the fringe field F are near an upper edge of the pixel electrode slit 18. Thus, liquid crystal molecules positioned at the upper edge of the pixel electrode slit 18 can be driven by the fringe field F. In this case, a width of the pixel electrode slit 18 is narrow enough such that the fringe field F is produced both at the common electrode plate 14 and the upper portion of the pixel electrode slit 18. Accordingly, the liquid crystal at both the common electrode plate 14 and the upper portion of the pixel electrode slit 18 can be all driven by the fringe field F.

A storage capacitor Cst stably maintaining a video signal supplied to the pixel electrode slit 18 is formed at an overlapping portion of the common electrode plate 14 and the pixel electrode slit 18.

A liquid crystal display device having an FFS-type thin film transistor substrate is a Normally Black Mode device in which a screen display state is black before an electric field signal is applied to between the common electrode 14 and the pixel electrode 18.

Even though the electric field signal is not applied to the common electrode 14 and the pixel electrode 18, an electric field can be formed between the data line 4 and the pixel electrode 18. When the screen display state is black, a liquid crystal at a pixel area adjacent to the data line 4 is driven owing to the electric field between the data line 4 and the pixel electrode 18, thus causing a light leakage. The pixel area adjacent to the data line 4 with a light leakage is corresponded to a black matrix BM area provided at the upper substrate in order to prevent the light leakage phenomenon. The area corresponding to the black matrix BM area of the upper substrate is a non-aperture area, so that the light leakage effectively reduces an aperture ratio of the FFS-type liquid crystal display device.

SUMMARY

According to one embodiment of the present invention, a thin film transistor substrate comprises a gate line disposed on a substrate, a data line that crosses the gate line with a gate insulating film therebetween to define a pixel area, and a thin film transistor connected to the gate line and the data line. The thin film transistor substrate of a horizontal electric field applying type further comprises a pixel electrode plate connected to the thin film transistor, a protective film disposed to cover the data line, the thin film transistor and the pixel electrode plate on the gate insulating film, and a common electrode disposed at an array area provided with the thin film transistor array and disposed in a mesh shape on the protective film.

According to another embodiment of the present invention, a method of fabricating an FFS-type thin film transistor substrate comprises forming a first conductive pattern group that includes a gate line and a gate electrode connected to the gate line on a substrate, forming a gate insulating film that covers the first conductive pattern group, and forming a second conductive pattern group that includes a data line that crosses the gate line to define a pixel area, a source electrode connected to the data line and a drain electrode opposed to the source electrode, and a semiconductor pattern that overlaps the second conductive pattern group. The method of fabricating an FFS-type thin film transistor substrate further comprises forming a pixel electrode plate that directly overlaps the drain electrode at the pixel area, forming a protective film that covers the second conductive pattern group, the semiconductor pattern and the pixel electrode plate on the gate insulating film, and forming a common electrode of a mesh shape on the protective film.

BRIEF DESCRIPTION OF THE DRAWINGS

These and other objects of the present invention will be apparent from the following detailed description of the embodiments of the present invention with reference to the accompanying drawings, in which:

FIG. 6A and FIG. 6B are a plan view and a sectional view illustrating a second mask process in a method of fabricating the thin film transistor substrate of a horizontal electric field applying type according to an embodiment of the present invention, respectively.

FIG. 7A and FIG. 7B are a plan view and a sectional view illustrating a third mask process in a method of fabricating the thin film transistor substrate of a horizontal electric field applying type according to an embodiment of the present invention, respectively.

DETAILED DESCRIPTION

Hereinafter, the preferred embodiments of the present invention will be described in detail with reference to FIG. 3 to FIG. 10. A common electrode pattern is displayed with dark color in order to divide an area provided with a common electrode in the following plan view.

Figure 1:
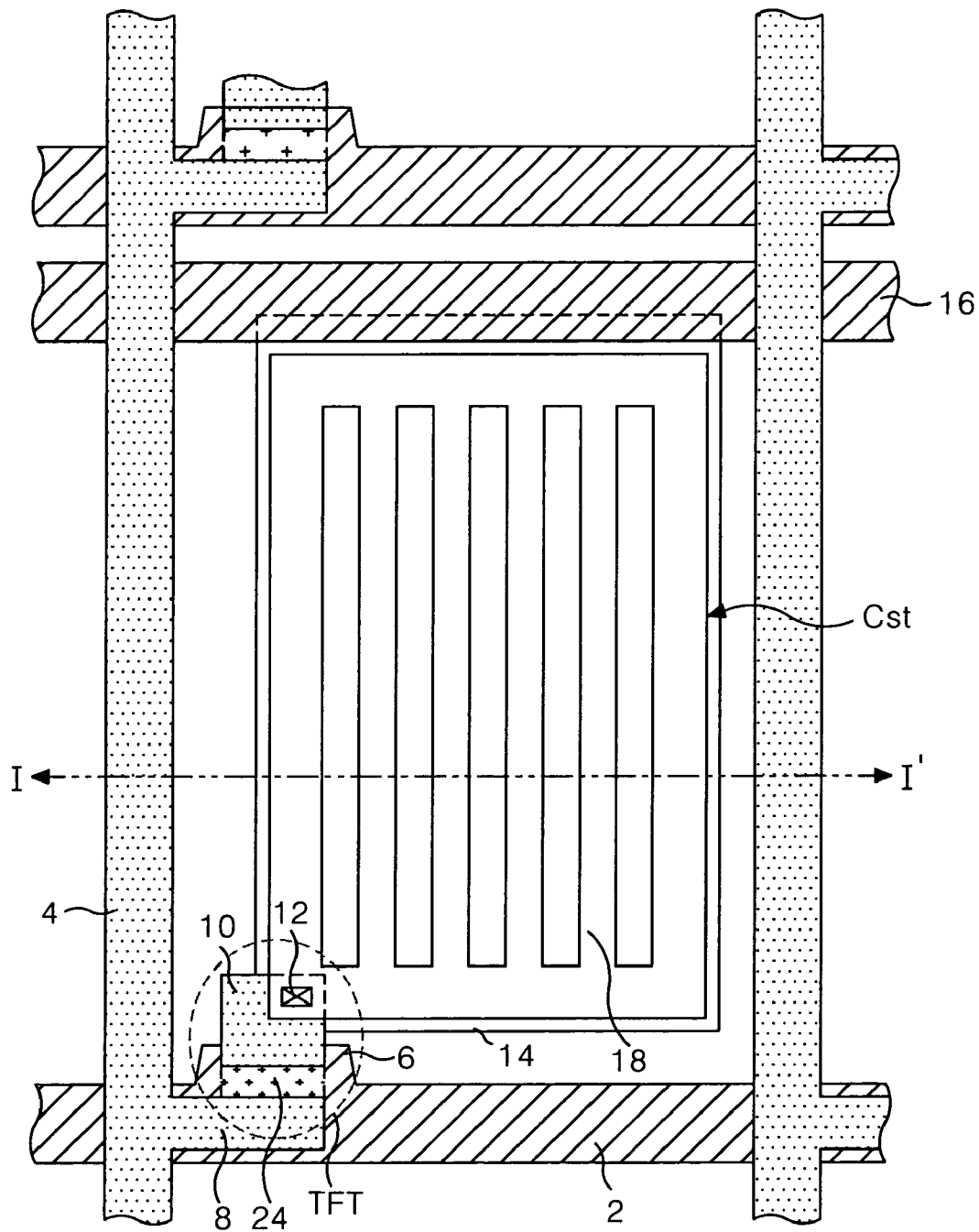
FIG. 1 is a plan view illustrating a related art thin film transistor substrate of a horizontal electric field applying type.
Figure 2:
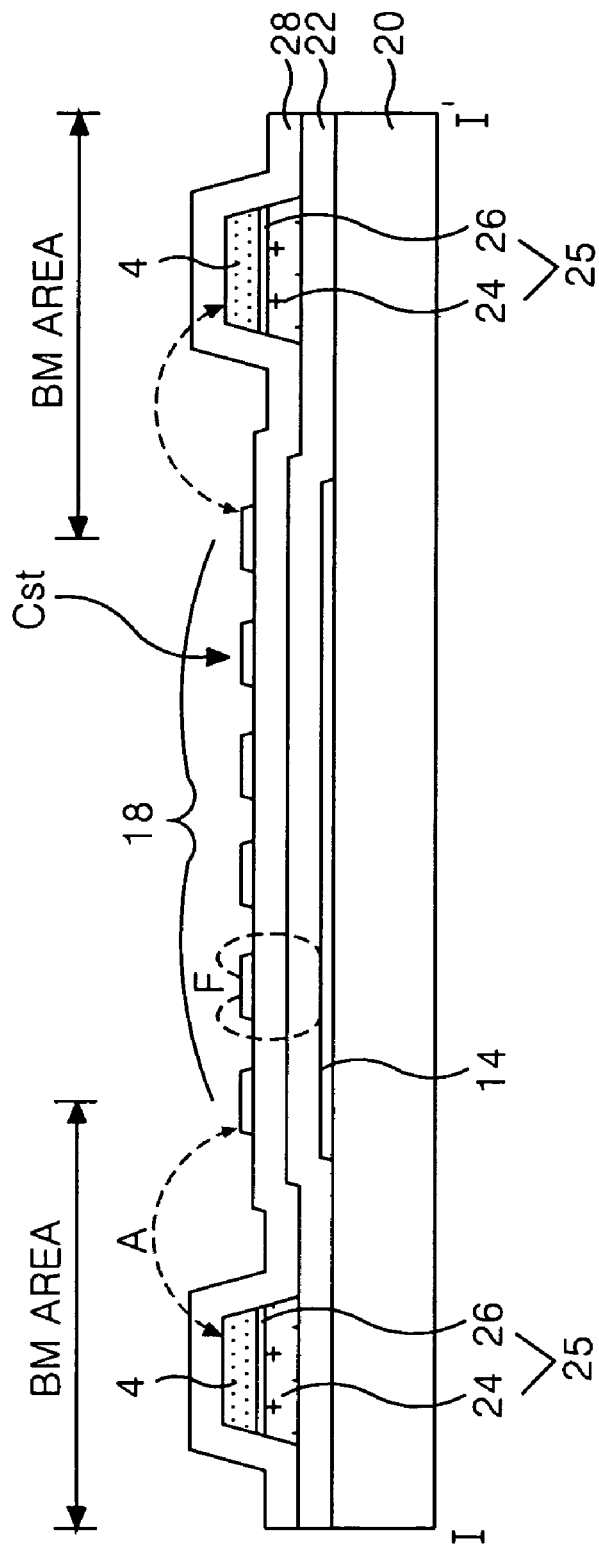
FIG. 2 is a sectional view of the thin film transistor substrate of a horizontal electric field applying type taken along the I-I' lines in FIG. 1.
Figure 3:
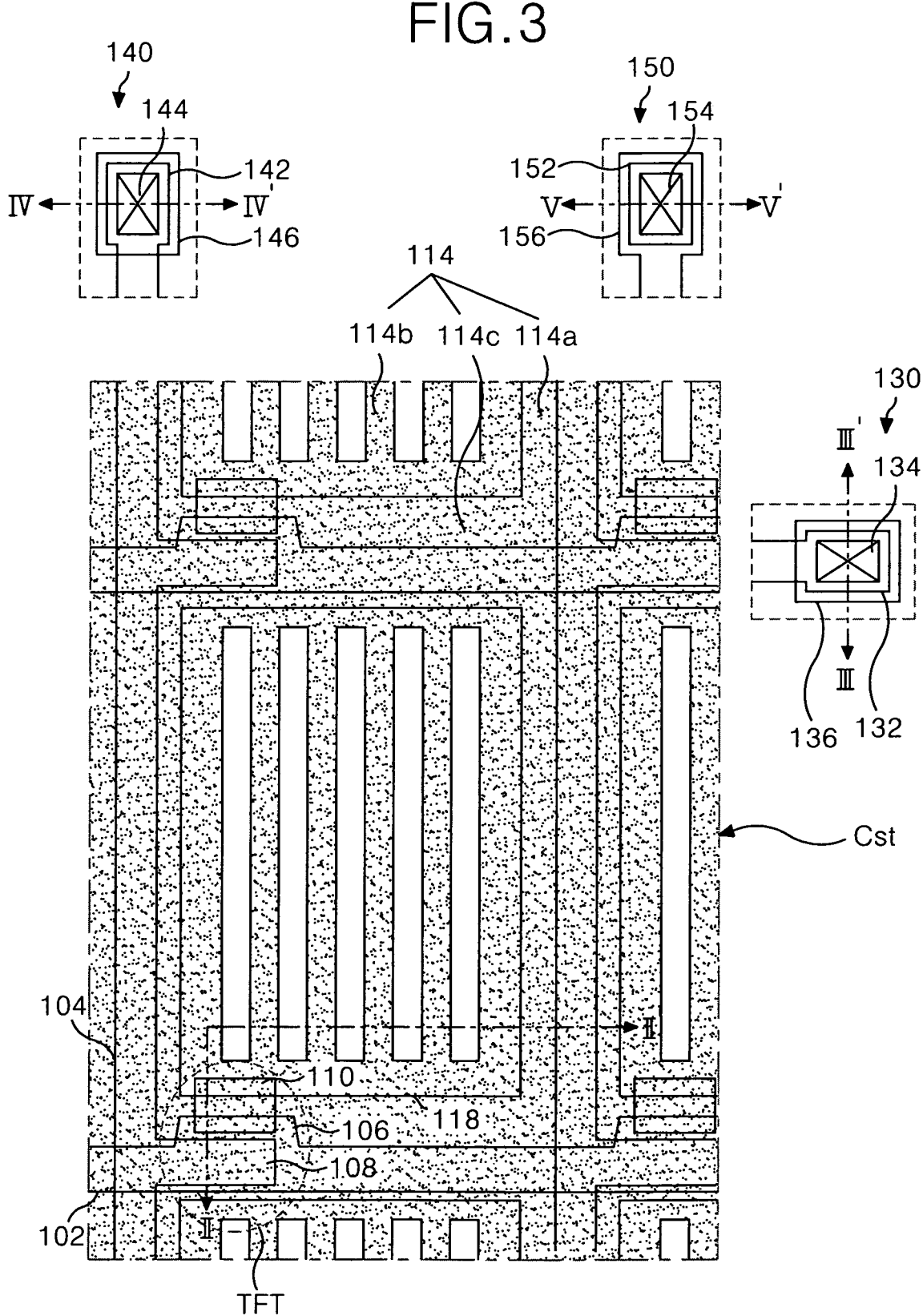
FIG. 3 is a plan view illustrating a thin film transistor substrate of a horizontal electric field applying type according to an embodiment of the present invention.
Figure 4:
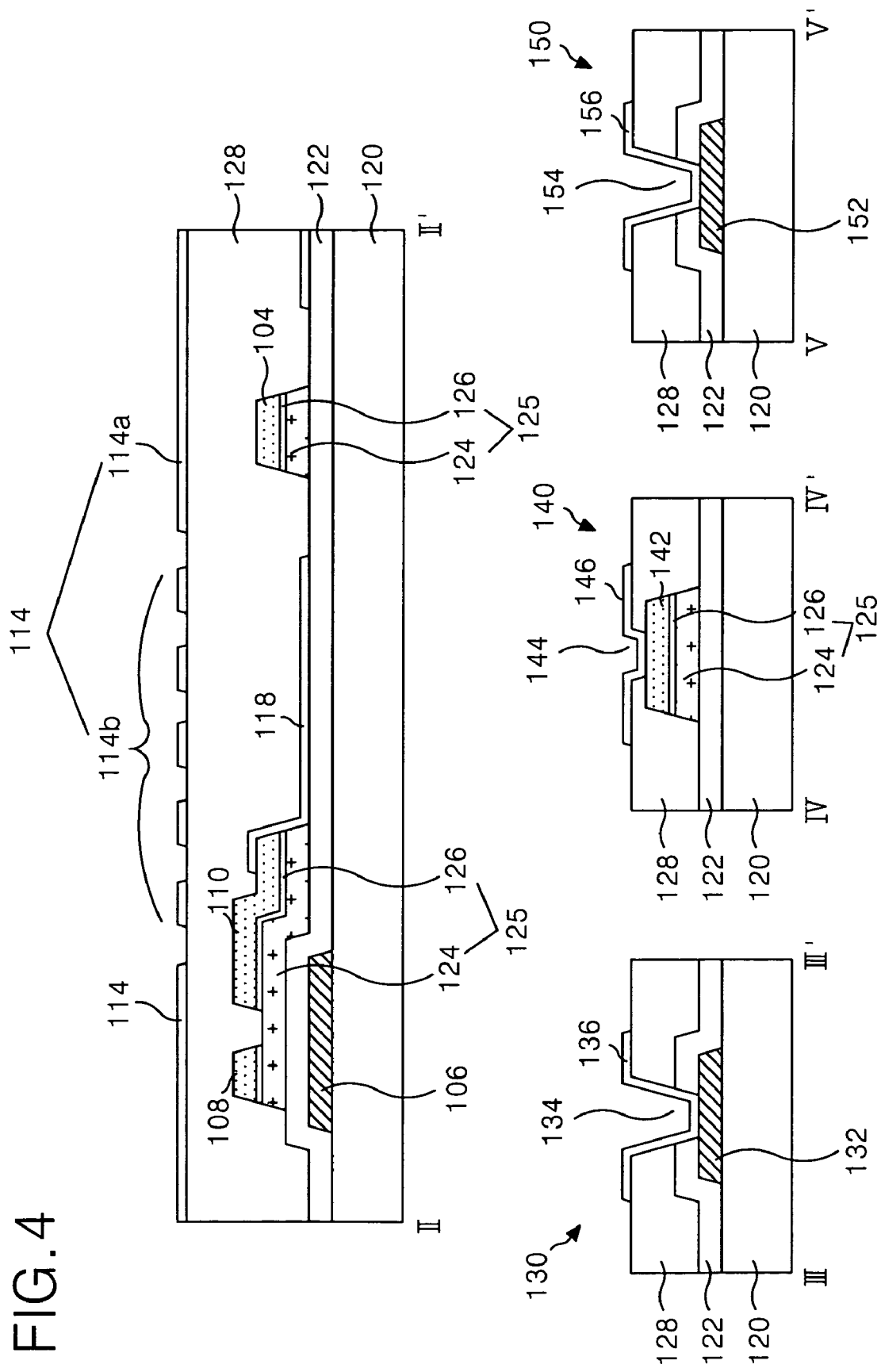
FIG. 4 is a sectional view of the thin film transistor substrate of a horizontal electric field applying type taken along the II-II', III-III', IV-IV' and V-V' lines in FIG. 3.

FIG. 3 is a plan view illustrating a thin film transistor substrate of a horizontal electric field applying type according to an embodiment of the present invention, and FIG. 4 is a sectional view of the thin film transistor substrate of a horizontal electric field applying type taken along the II-II', III-III', IV-IV' and V-V' lines in FIG. 3.

Referring to FIG. 3 and FIG. 4, a thin film transistor substrate includes a gate line 102 and a data line 104 formed to cross each other with a gate insulating film 122 therebetween on a lower substrate 120. A thin film transistor TFT is provided for each intersection. A common electrode 114 is provided at an array area where a pixel electrode plate 118 connected to the thin film transistor TFT at a pixel area is disposed. The pixel electrode plate 118 and the common electrode 114 are formed with a protective film 128 therebetween to thereby provide a fringe field.

The gate line 102 supplying a gate signal and the data line 104 supplying a data signal cross each other to define a pixel area.

The thin film transistor TFT allows a pixel signal applied to the data line 104 to be charged into the pixel electrode plate 118 and be kept in response to a gate signal applied to the gate line 102. To this end, the thin film transistor TFT includes a gate electrode 106 connected to the gate line 102, a source electrode 108 connected to the data line 104, a drain electrode 110 connected to the pixel electrode plate 118, an active layer 124 that overlaps the gate electrode 106 with the gate insulating film 122 therebetween to provide a channel between the source electrode 108 and the drain electrode 110, and a semiconductor pattern 125 that includes an ohmic contact layer 126 for making an ohmic contact with the source electrode 108, the drain electrode 110 and the active layer 124.

The semiconductor pattern 125 that includes the active layer 124 and the ohmic contact layer 126 overlaps the data line 104.

The pixel electrode plate 118 is directly formed on the drain electrode 110 of the thin film transistor to connect to the drain electrode 110. The pixel electrode plate 118 comprises a transparent metal layer and is formed for each pixel area. The common electrode 114 comprises a transparent metal layer and is comprised of the data line 104, a shielding portion 114a that overlaps a portion of a pixel area adjacent to the data line 104, a slit portion 114b that overlaps the pixel electrode plate 118 and is made of a slit pattern for each pixel area, and a connector 114c extended in parallel from the shielding portion 114a and the slit portion 114b to the gate line 102 to thereby provide at an array area.

The connector 114c connects the slit portion 114b and the shielding portion 114a of the pixel area that adjoins each other with the gate line 102 therebetween.

The shielding portion 114a shields an electric field formed between the data line 104 and the pixel electrode 118. The shielding portion 114a that shields the electric field formed between the data line 104 and the pixel electrode 118 prevents a liquid crystal in the pixel area adjacent to the data line 104 from being driven by the electric field formed between the data line 104 and the pixel electrode plate 118. Thus a light leakage in the pixel area adjacent to the data line 104 is prevented when the liquid crystal display device is a black state. Thus, a portion corresponding to a black matrix BM area of the upper substrate is reduced, so that it becomes possible to increase an aperture area.

The slit portion 114b overlaps the pixel electrode plate 118 with the protective film 128 therebetween to thereby provide a fringe field between the slit portion 114b and the pixel electrode plate 118. The fringe field drives all the liquid crystals at the slit portion 114b and the upper pixel electrode plate 118.

As described above, in the liquid crystal display device of a horizontal electric field applying type according to one embodiment of the present invention, liquid crystal molecules arranged in the horizontal direction between the thin film transistor substrate and the color filter substrate is rotated by the electric field formed between the common electrode 114 and the pixel electrode plate 118 due to a dielectric anisotropy. And, in the liquid crystal display device of a horizontal electric field applying type according to one embodiment of the present invention, transmittance of a light transmitting the pixel area is differentiated according to a rotation extent of the liquid crystal molecules, thereby implementing a gray level scale.

A storage capacitor Cst stably maintaining a video signal supplied to the pixel electrode plate 118 is formed at an overlapping portion of the common electrode 114 and the pixel electrode plate 118.

The common electrode 114 is formed at the entire array area to thereby increase an overlapping area of the common electrode 114 and the pixel electrode 118. Accordingly, the protective film 128 is made from an organic insulating material that has a low permittivity in order to improve a picture quality reduction problem such as greenish phenomenon. A capacitance value of a storage capacitor is overly increased by an overlapping area increase between the common electrode 114 and the pixel electrode 118. The organic insulating material comprises acryl-group compound, Teflon, BCB (benzocyclobutene), Cytop or PFCB (perfluorocyclobutane) for the storage capacitor to maintain a proper capacitance value. The protective film 128 is 1 to 2 μm in thickness using the above-mentioned organic insulating material to properly maintain a capacitance value of the storage capacitor even though the overlapping area of the common electrode 114 and the pixel electrode 118 is increased.

The gate line 102 supplies a gate signal to the gate electrode 106 of the thin film transistor TFT, and is connected, via a gate pad 130, to a gate driver (not shown). The gate pad 130 is comprised of a lower gate pad electrode 132 extended from the gate line 102, and an upper gate pad electrode 136 connected, via a first contact hole 134 that passes through the protective film 128 and the gate insulating film 122 to expose the lower gate pad electrode 132, to the lower gate pad electrode 132.

The data line 104 supplies a pixel signal, via the drain electrode 110 of the thin film transistor, to the pixel electrode 118. The data line 104 is connected, via a data pad 140, to a data driver (not shown). The data pad 140 is comprised of a lower data pad electrode 142 extended from the gate line 104, and an upper data pad electrode 146 connected, via a second contact hole 144 that passes through the protective film 128 to expose the lower data pad electrode 142, to the lower data pad electrode 142. The semiconductor pattern 125 is overlapped under the lower data pad electrode 142.

The above-mentioned data line 104 is formed from a low-resistance metal such as copper Cu to improve a RC delay phenomenon by the data line 104.

The common electrode 114 is supplied with a reference voltage for driving a liquid crystal, via a common pad 150, from a power supplier (not shown). The common pad 150 is comprised of a lower common pad electrode 152 extended from a gate metal on the substrate 120, and an upper common pad electrode 156 connected, via a third contact hole 154 that passes through the protective film 128 and the gate insulating film 122 to expose the lower common pad electrode 152, to the lower common pad electrode 152. The upper common pad electrode 156 is extended from the common electrode 114 to connect to the common electrode 114.

The common electrode 114 according to one embodiment of the present invention is formed in a mesh structure at the entire array area. The related art includes separate common lines supplied with a common voltage to allow the common voltage to flow for each separate common line. On the other hand, because the common electrode 114 in the mesh structure has a wider area flowing the common voltage than in the related art, a resistance of the common electrode 114 is reduced more than in the related art. The common electrode structure does not have the related art common line, so that it is possible to increase an aperture area with the removal of the common line included in the related art.

The thin film transistor substrate of a horizontal electric field applying type having such configuration as described above is formed by the following five-round mask process.

Figure 5A:
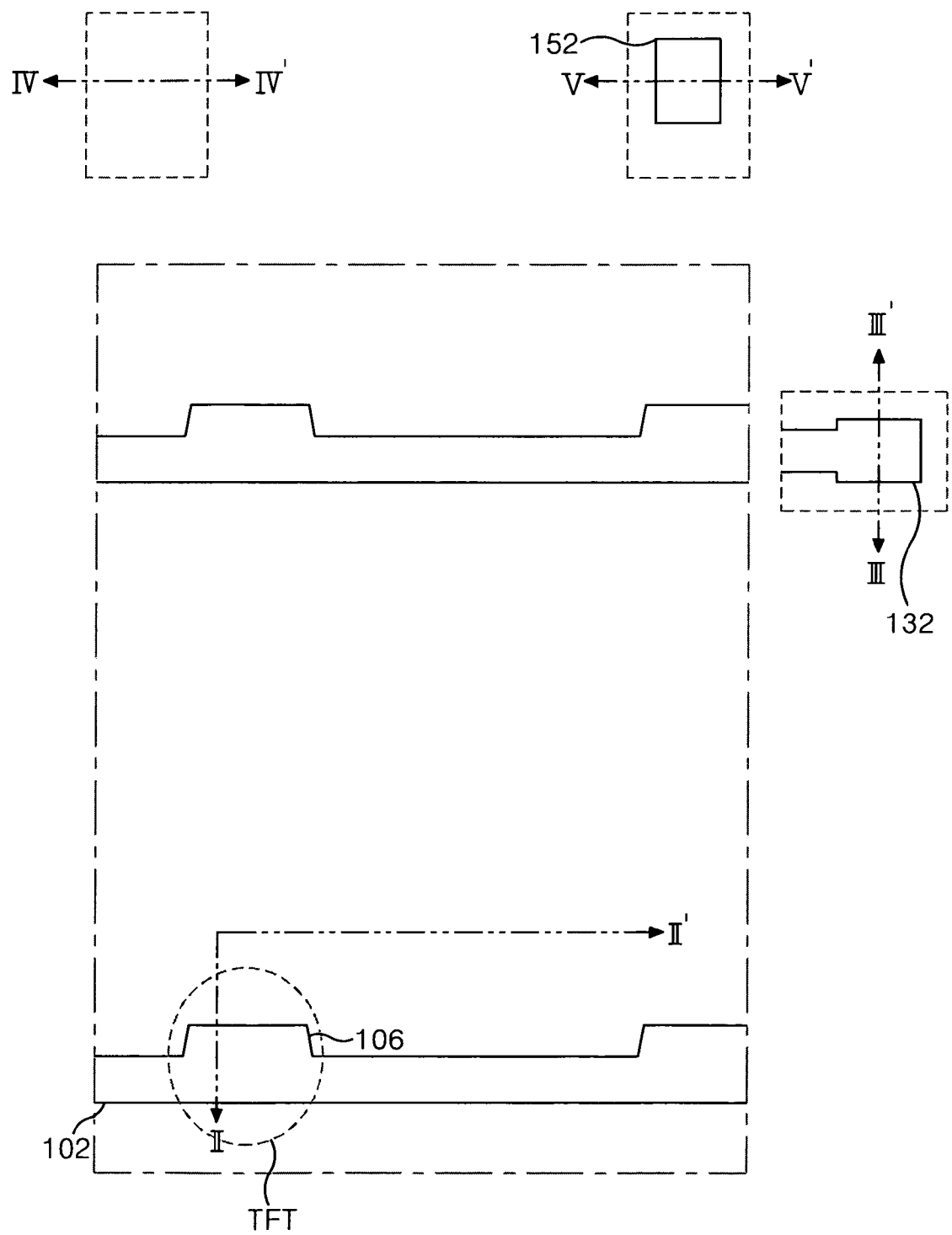
FIG. 5A and FIG. 5B are a plan view and a sectional view illustrating a first mask process in a method of fabricating the thin film transistor substrate of a horizontal electric field applying type according to an embodiment of the present invention, respectively.
Figure 5B:
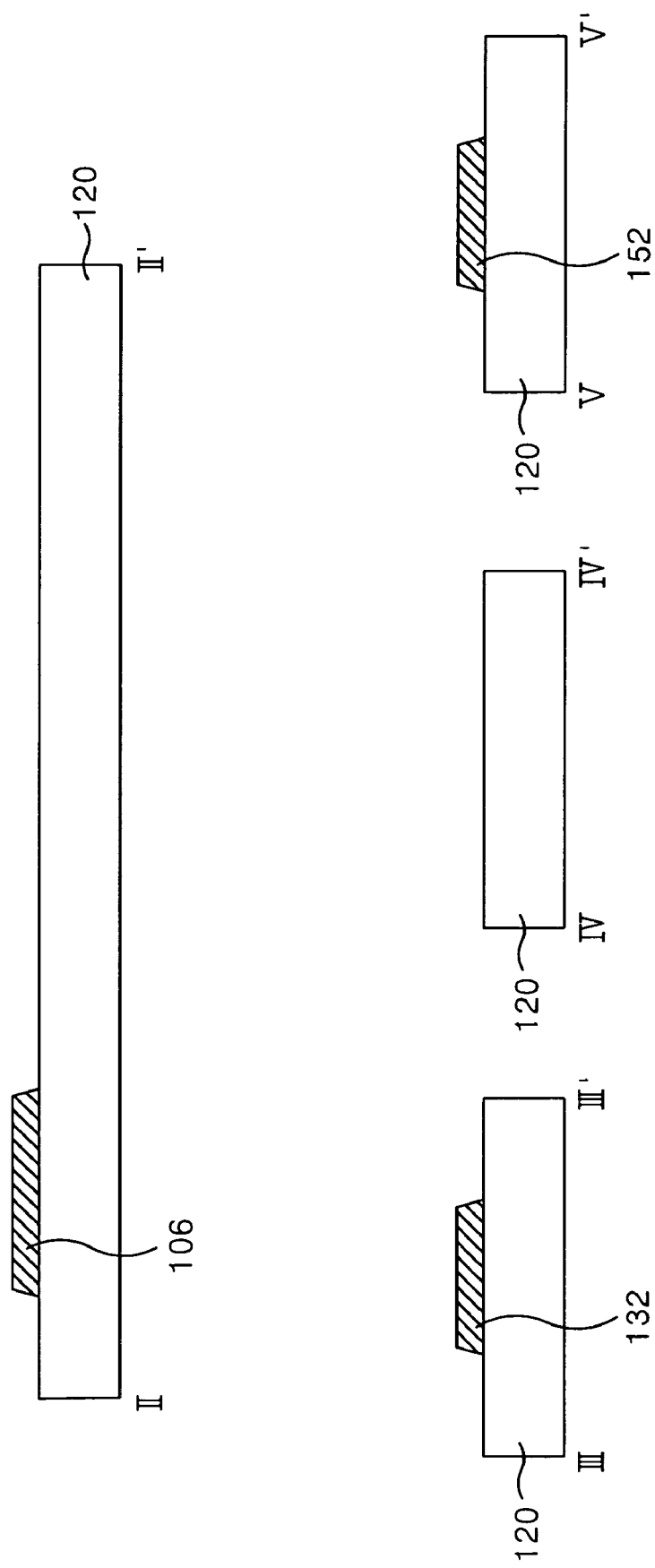

FIG. 5A and FIG. 5B are a plan view and a sectional view illustrating a first mask process in a method of fabricating the thin film transistor substrate of a horizontal electric field applying type according to an embodiment of the present invention, respectively.

Referring to FIG. 5A and FIG. 5B, a first conductive pattern group that includes the gate line 102, the gate electrode 106 connected to the gate line 102, the lower gate pad electrode 132 and the lower common pad electrode 152 is formed on the substrate 120 by a first mask process.

Specifically, the gate metal layer is disposed on the lower substrate 120 by a deposition technique such as a sputtering, etc. The gate metal layer is formed from Al-group metal, Copper Cu, Chrome Cr, etc. Next, the gate metal layer is patterned by a photolithography and an etching process using a first mask, thereby providing a first conductive pattern group that includes the gate line 102, the gate electrode 106, the lower gate pad electrode 132 and the lower common pad electrode 152.

Figure 6A:
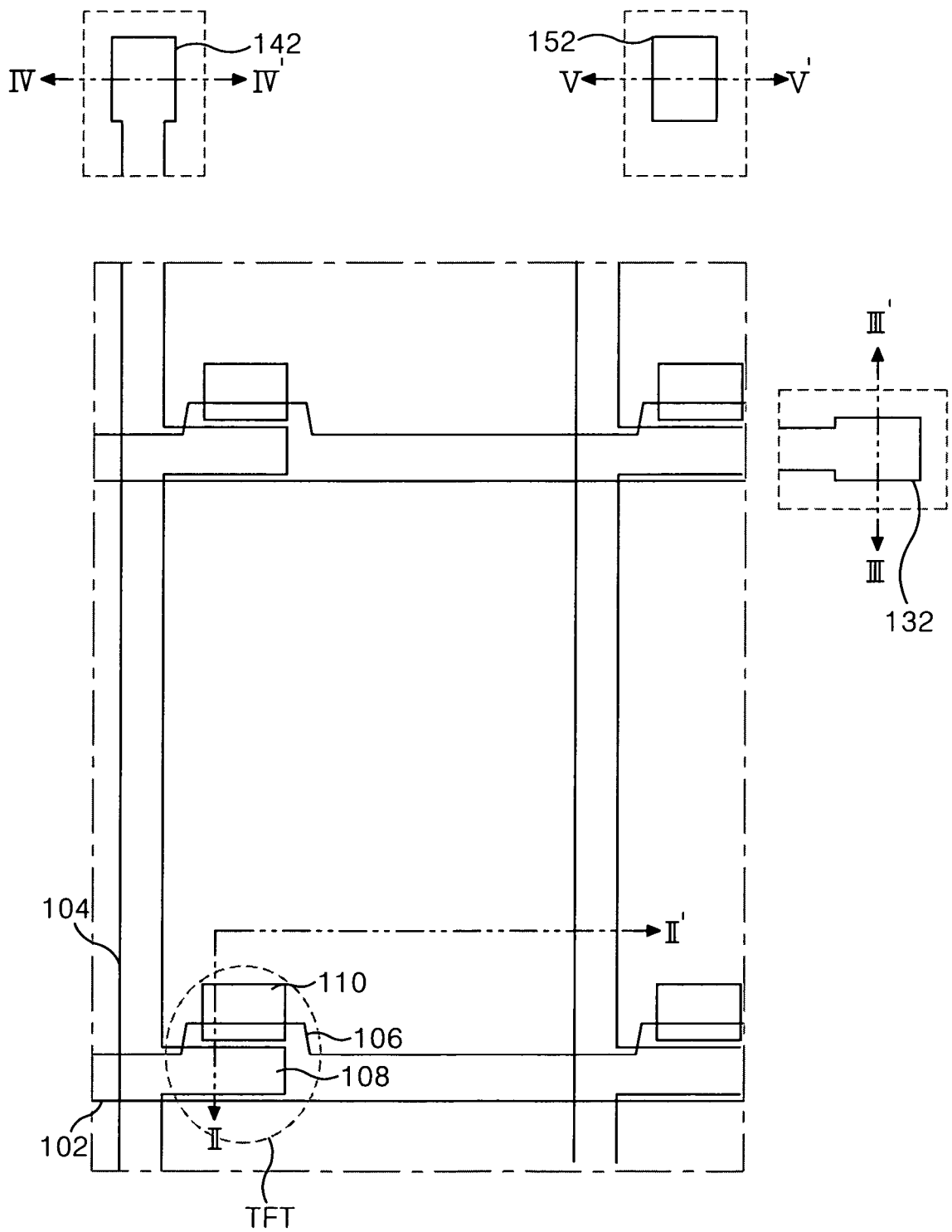

FIG. 6A and FIG. 6B are a plan view and a sectional view illustrating a second mask process in a method of fabricating the thin film transistor substrate of a horizontal electric field applying type according to an embodiment of the present invention, respectively.

Referring to FIG. 6A and FIG. 6B, the gate insulating film 122 is coated on the substrate 120 that includes the first conductive pattern group. And, a second conductive pattern group is formed on the gate insulating film 122 by a second mask process. The second conductive pattern group includes the semiconductor pattern 125 that contains the active layer 124 and the ohmic contact layer 126, the data line 104, the source electrode 108 extended from the data line 104, and the drain electrode 110 opposed to the source electrode 108 with a channel portion in which the active layer 124 is exposed therebetween. The semiconductor pattern 125 and the second conductive pattern group are formed by a single mask process employing a diffractive exposure mask or a half tone mask.

Specifically, the gate insulating film 122, an amorphous silicon layer, an amorphous silicon layer doped with an $n^+$ or $p^+$ impurity and a source/drain metal layer are sequentially disposed on the substrate 120 that includes the first conductive pattern group. For example, the gate insulating film 122, the amorphous silicon layer, the amorphous silicon layer doped with an $n^+$ or $p^+$ impurity are formed by a PECVD process, and the source/drain metal layer is formed by a sputtering process. The gate insulating film 122 is formed from the inorganic insulating material such as silicon oxide ($SiO_x$) or silicon nitride ($SiN_x$), and the source/drain metal layer is formed from Cr, Mo, MoW, Al/Cr, Cu, Al(Nd), Al/Mo, Al(Nd)/Al, Al(Nd)/Cr, Mo/Al(Nd)/Mo, Cu/Mo, Ti/Al(Nd)/Ti, etc. Preferably, the source/drain metal layer includes Cu for a low-resistance wiring of the data line. Subsequently, a photo-resist is coated on the source/drain metal layer, and then the photo-resist is exposed and developed by a photolithography process using the diffractive exposure mask to thereby provide a photo-resist pattern that has a relatively thin channel portion.

Next, the amorphous silicon layer is patterned at the source/drain metal layer by an etching process using the photo-resist pattern to thereby provide the data line 104, the lower data pad electrode 142, a source/drain pattern extended from the data line 104 and the semiconductor pattern 125 overlapped under the data line 104 and the lower data pad electrode 142.

Next, the photo-resist pattern is ashed by an ashing process using $O_2$ plasma to thereby remove the photo-resist pattern in the channel portion. And, the source/drain pattern exposed by the etching process using the ashed photo-resist pattern and the ohmic contact layer 126 under thereof are removed to thereby provide the source electrode 108 and the drain electrode 110, and provide the channel portion in which the active layer 124 is exposed.

Subsequently, the photo-resist pattern that remains on the second conductive pattern group is removed by a stripping process.

Figure 7A:
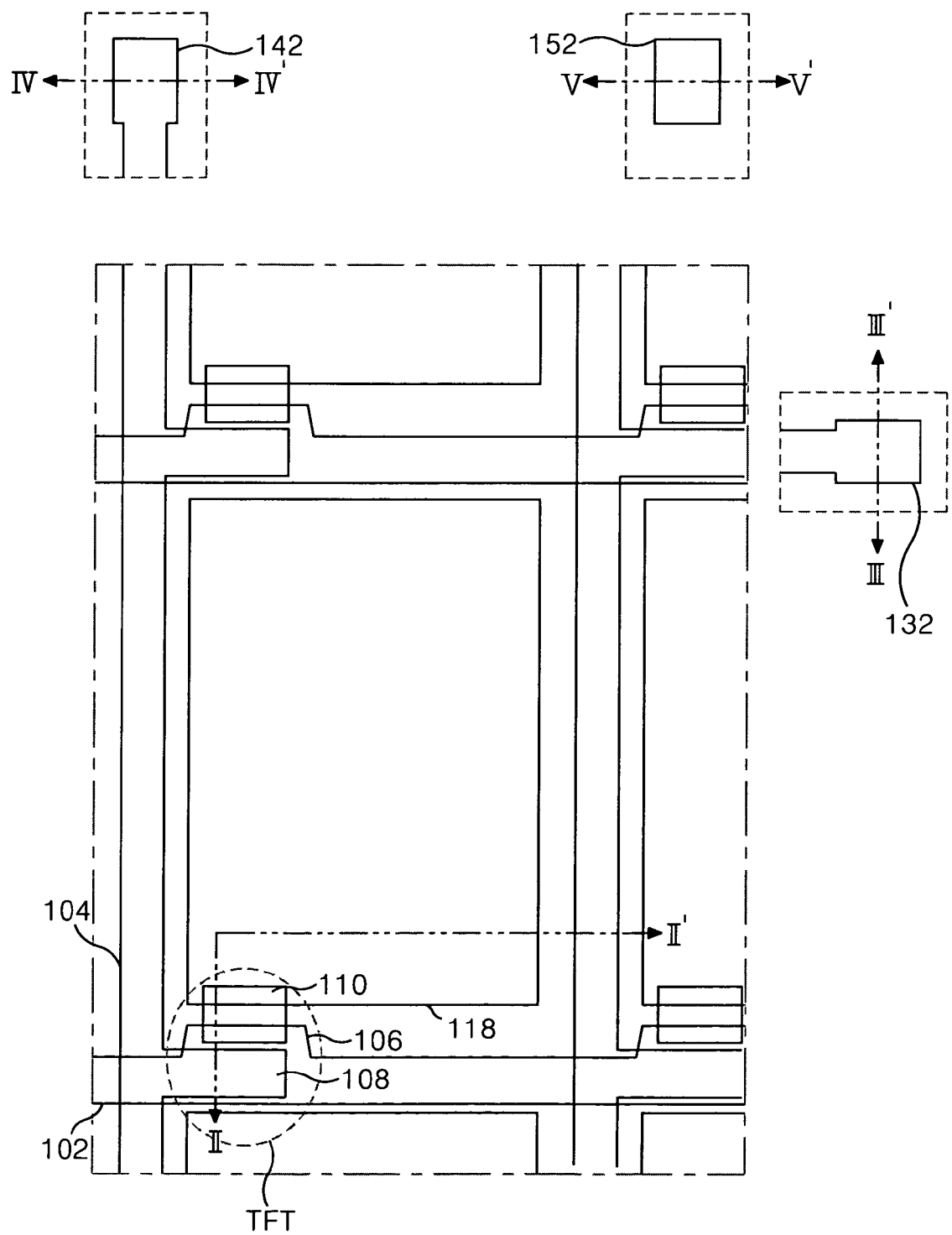

FIG. 7A and FIG. 7B are a plan view and a sectional view illustrating a third mask process in a method of fabricating the thin film transistor substrate of a horizontal electric field applying type according to an embodiment of the present invention, respectively.

Referring to FIG. 7A and FIG. 7B, the pixel electrode plate 118 is directly formed on the drain electrode 110 and on the gate insulating film 122 that includes the semiconductor pattern and the second conductive pattern group in the third mask process.

Specifically, a transparent metal layer such as ITO, TO, IZO, etc is disposed on the gate insulating film 122 that includes the semiconductor pattern and the second conductive pattern group by a deposition technique such as sputtering. Next, the transparent metal layer is patterned by a photolithography process and an etching process using the third mask to thereby provide the pixel electrode plate 118.

Figure 8A:
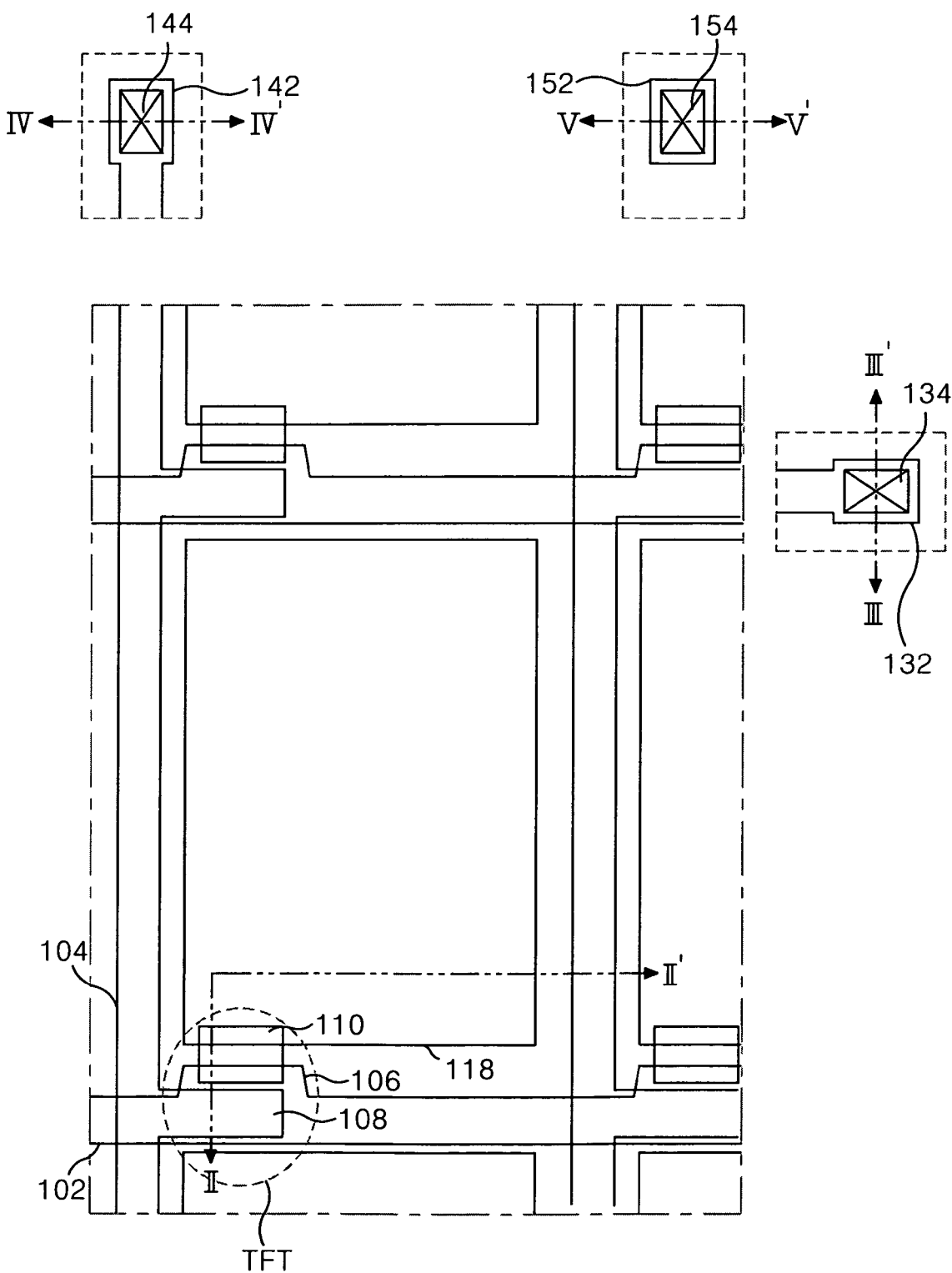
FIG. 8A and FIG. 8B are a plan view and a sectional view illustrating a fourth mask process in a method of fabricating the thin film transistor substrate of a horizontal electric field applying type according to an embodiment of the present invention, respectively.
Figure 8B:
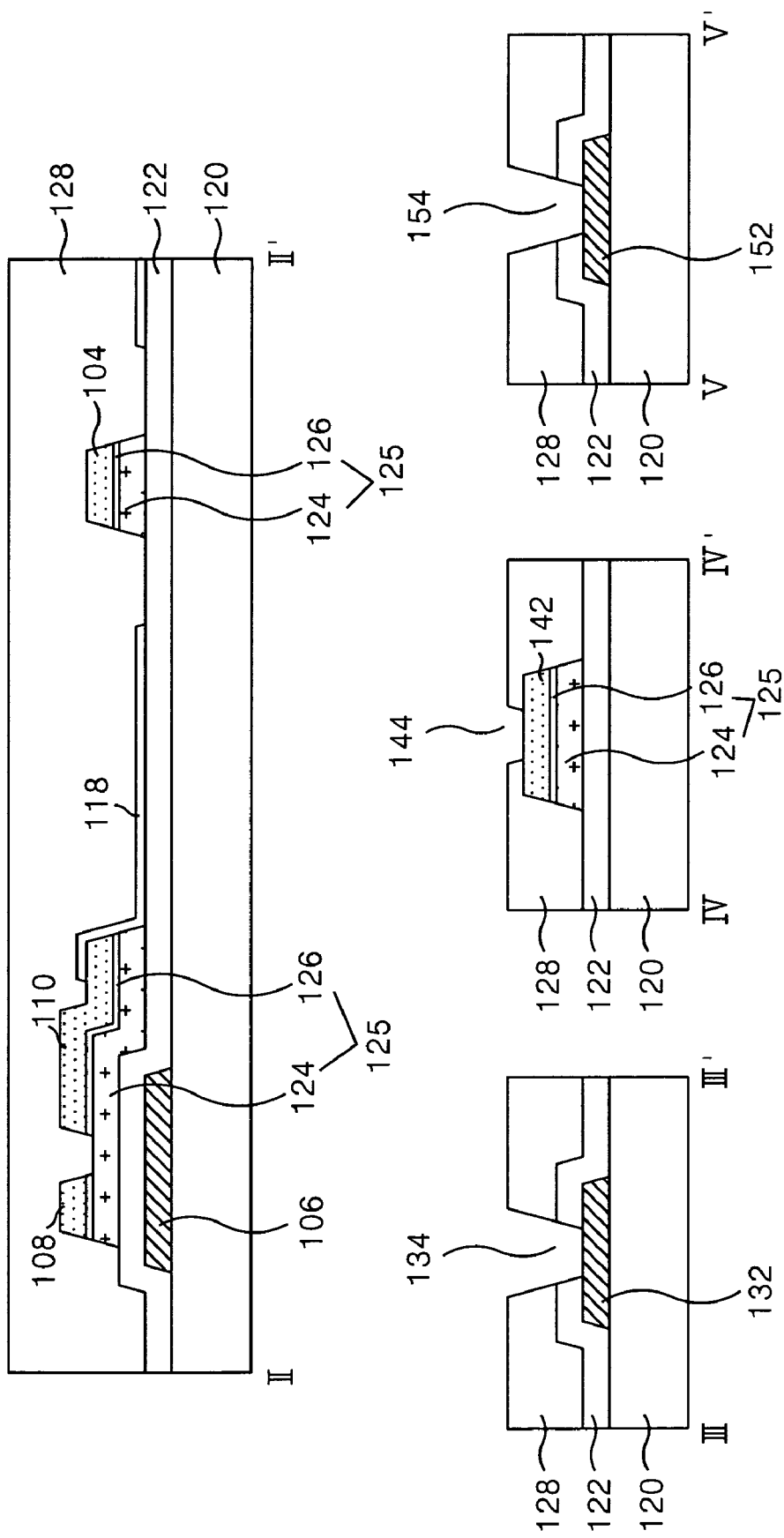

FIG. 8A and FIG. 8B are a plan view and a sectional view illustrating a fourth mask process in a method of fabricating the thin film transistor substrate of a horizontal electric field applying type according to an embodiment of the present invention, respectively.

Referring to FIG. 8A and FIG. 8B, an organic protective film 128 that includes a first to a third contact holes 134, 144 and 154 is formed on the gate insulating film 122 that includes the pixel electrode plate 118 by the fourth mask process.

Specifically, the inorganic insulating material, such as silicon oxide ($SiO_x$) and silicon nitride ($SiN_x$), can be disposed on the gate insulating film 122 that includes the pixel electrode plate 118 by a technique, such as the PECVD process, a spin coating process and a spinless coating process, but the organic insulating material that has a low permittivity is disposed to thereby maintain a storage capacitor that has a proper capacitance value. The organic insulating material that has a low permittivity comprises acryl-group compound, Teflon, BCB (benzocyclobutene), Cytop or PFCB (perfluorocyclobutane). Next, an insulating material and the gate insulating film 122 under thereof are patterned by a photolithography process and an etching process using the fourth mask to thereby provide the protective film 128 that includes the first to the third contact holes 134, 144 and 154.

The first and third contact holes 134 and 154 pass through the protective film 128 and the gate insulating film 122 to expose the lower gate pad electrode 132 and the lower common pad electrode 152. The second contact hole 144 passes through the protective film 128 to expose the lower data pad electrode 146.

Figure 9A:
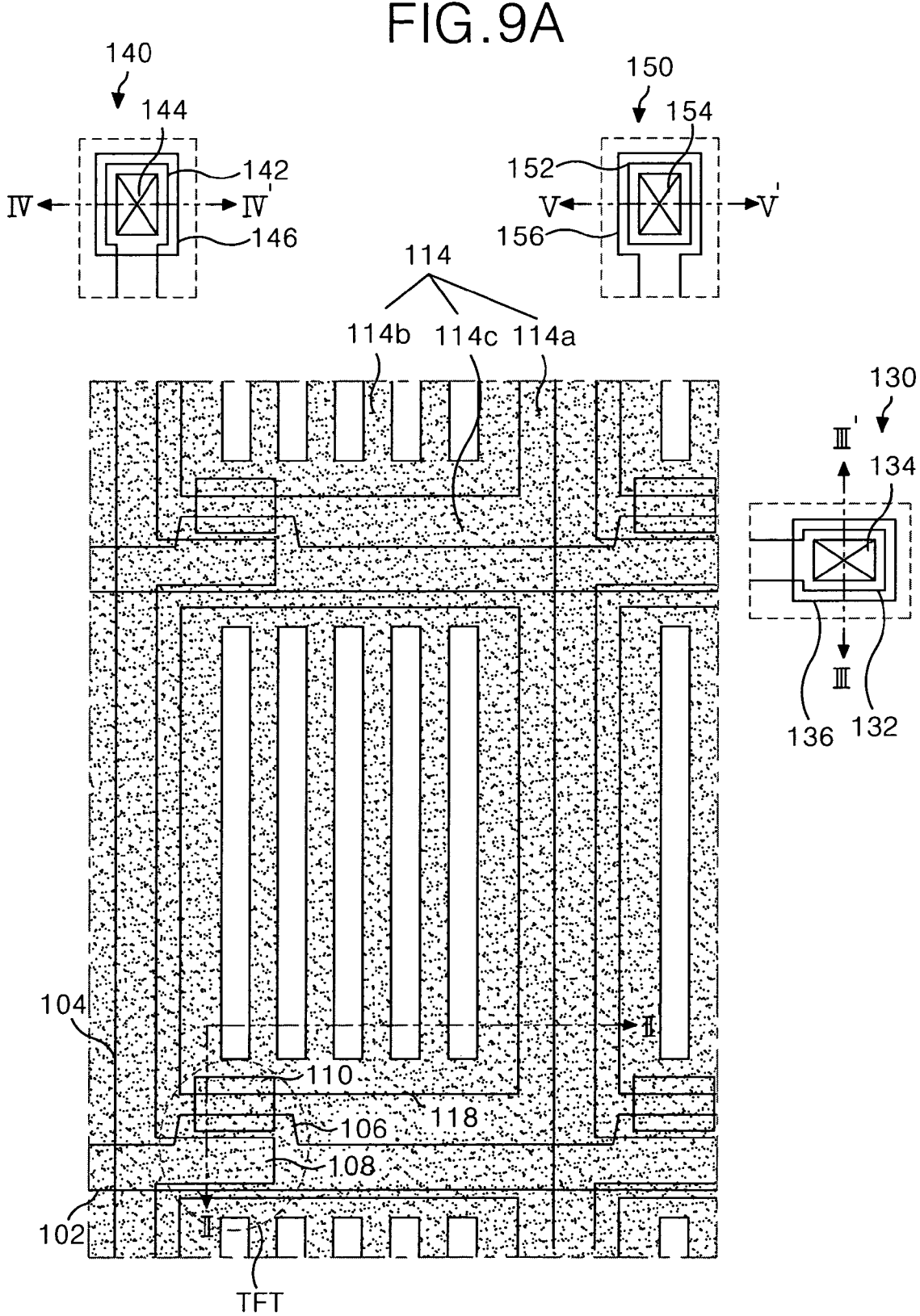
FIG. 9A and FIG. 9B are a plan view and a sectional view illustrating a fifth mask process in a method of fabricating the thin film transistor substrate of a horizontal electric field applying type according to an embodiment of the present invention, respectively.
Figure 9B:
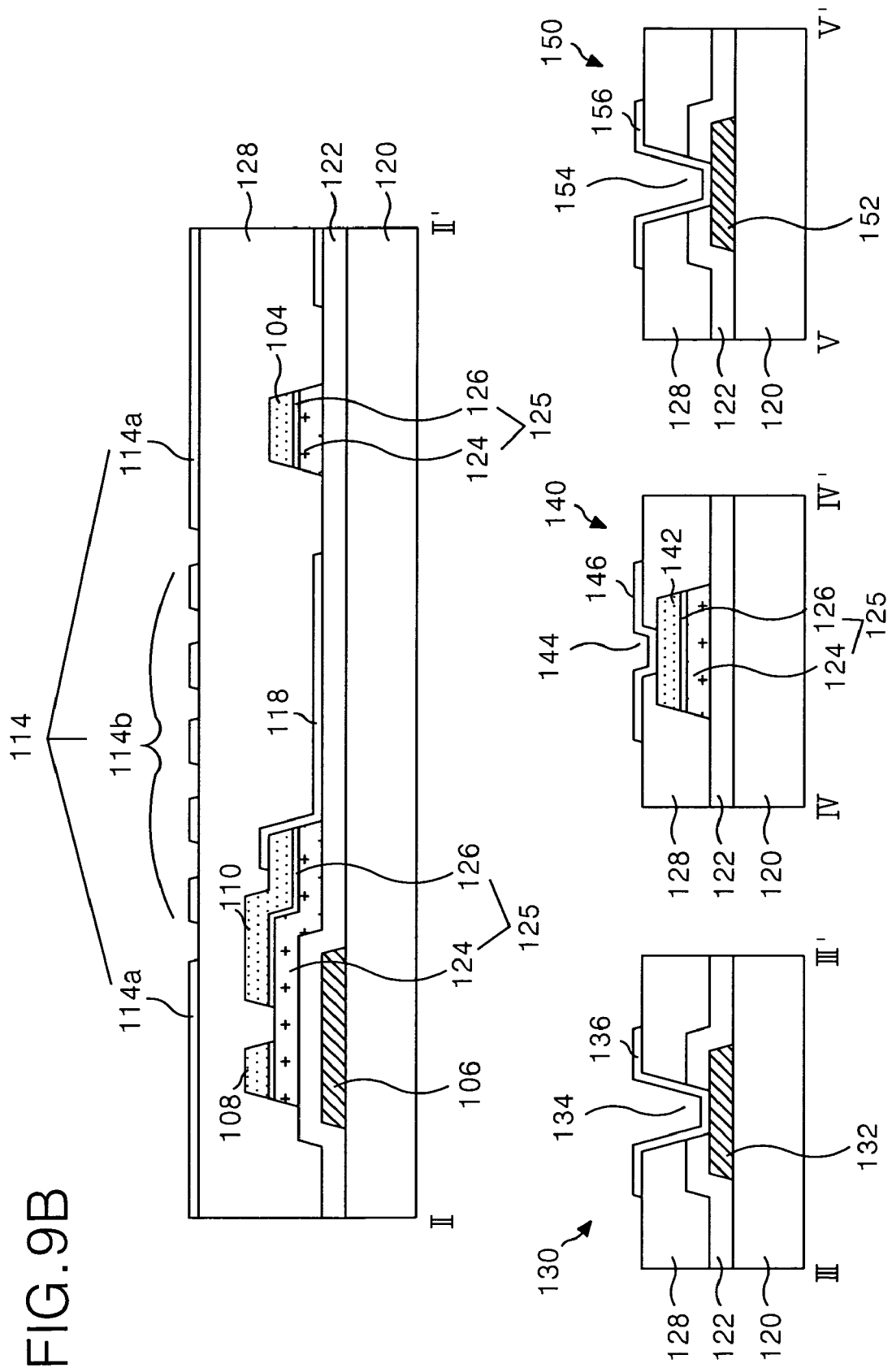

FIG. 9A and FIG. 9B are a plan view and a sectional view illustrating a fifth mask process in a method of fabricating the thin film transistor substrate of a horizontal electric field applying type according to an embodiment of the present invention, respectively.

Referring to FIG. 9A and FIG. 9B, a third conductive pattern group is formed on the protective film 128 that contains the first to the third contact holes 134, 144 and 154 by the fifth mask process. The third conductive pattern group includes the upper gate pad electrode 136, the upper data pad electrode 146, the common electrode 114 and the upper common pad electrode 156 extended from the common electrode 114.

Specifically, a transparent metal layer, such as ITO, TO, IZO, is disposed on the protective film 128 that contains the first to the third contact holes 134, 144 and 154 by a deposition technique such as sputtering. Next, the transparent metal layer is patterned by a photolithography process and an etching process using the fifth mask to thereby provide a third conductive pattern group on the protective film 128.

Figure 10:
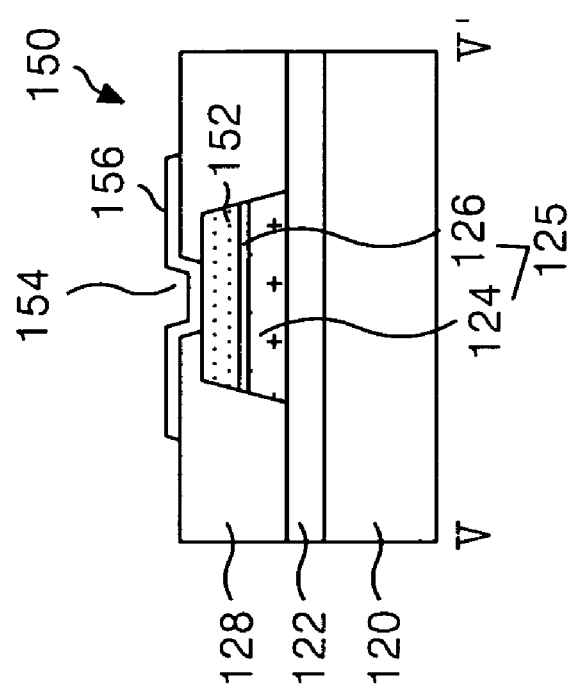
FIG. 10 is a sectional view illustrating another structure of a common pad according to one embodiment of the present invention.

FIG. 10 is a sectional view illustrating another structure of a common pad according to one embodiment of the present invention.

Referring to FIG. 10, the common pad 150 can be formed in the same structure as a vertical structure of the data pad 140. In other words, the common pad 150 is comprised of the lower common pad electrode 152 formed on the gate insulating film 122 and the upper common pad electrode 156 connected, via the third contact hole 156 that passes through the protective film 128 to expose the lower common pad electrode 152, to the lower common pad electrode 152. Herein, the semiconductor pattern 125 is overlapped under the lower common pad electrode 152, and the upper common pad electrode 156 is extended from the common electrode 114. And, the common pad 150 shown in FIG. 10 is formed in a process same as a process for forming the data pad 140, so that a description of a method of fabricating the common pad 150 shown in FIG. 10 will be omitted.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A thin film transistor substrate comprising:
    a gate line disposed on a substrate;
    a data line that crosses the gate line with a gate insulating film therebetween to define a pixel area;
    a thin film transistor connected to the gate line and the data line;
    a pixel electrode plate connected to the thin film transistor;
    a protective film disposed to cover the data line, the thin film transistor and the pixel electrode plate on the gate insulating film; and
    a common electrode disposed at an array area provided with the thin film transistor array and disposed in a mesh shape on the protective film.

2. The thin film transistor substrate as claimed in claim 1, wherein the common electrode includes:
    a slit portion that comprises a slit pattern that overlaps the pixel electrode plate;
    a shielding portion that overlaps the data line; and
    a connector extended from the slit portion and the shielding portion to be provided in paralleled to the gate line.

3. The thin film transistor substrate as claimed in claim 1, wherein the protective film comprises an organic material that includes one of an acryl-group compound, a Teflon, a BCB, a Cytop and a PFCB.

4. The thin film transistor substrate as claimed in claim 1, wherein the common electrode is connected to a common pad that supplies a common voltage, the common pad including:
    a lower common pad electrode disposed on the substrate; and
    an upper common pad electrode connected, via a contact hole that passes through the gate insulating film and the protective film, to the lower common pad electrode and extended from the common electrode.

5. The thin film transistor substrate as claimed in claim 1, wherein the common electrode is connected to a common pad that supplies a common voltage, the common pad including:
    a lower common pad electrode disposed on the gate insulating film; and
    an upper common pad electrode connected, via a contact hole that passes through the protective film, to the lower common pad electrode and extended from the common electrode.

6. The thin film transistor substrate as claimed in claim 1, wherein the data line comprises a low-resistance metal that includes copper.

7. The thin film transistor substrate as claimed in claim 1, wherein the thin film transistor includes:
    a gate electrode connected to the gate line;
    a source electrode connected to the data line; and
    a drain electrode opposed to the source electrode,
    wherein the pixel electrode plate is directly disposed on the drain electrode.

8. The thin film transistor substrate as claimed in claim 1, wherein the common electrode is substantially entirely disposed at the array area provided with the thin film transistor array.

9. A method of fabricating a thin film transistor substrate comprising:
    forming a first conductive pattern group that includes a gate line and a gate electrode connected to the gate line on a substrate;
    forming a gate insulating film that covers the first conductive pattern group;
    forming a second conductive pattern group that includes a data line that crosses the gate line to define a pixel area, a source electrode connected to the data line and a drain electrode opposed to the source electrode, and a semiconductor pattern that overlaps the second conductive pattern group;
    forming a pixel electrode plate that directly overlaps on the drain electrode at the pixel area;
    forming a protective film that covers the second conductive pattern group, the semiconductor pattern and the pixel electrode plate on the gate insulating film; and
    forming a common electrode of a mesh shape on the protective film.

10. The method of fabricating the thin film transistor substrate as claimed in claim 9, wherein the common electrode comprises:
    a slit portion that comprises a slit pattern that overlaps the pixel electrode plate;
    a shielding portion that overlaps the data line; and
    a connector extended from the slit portion and the shielding portion to be provided in paralleled to the gate line.

11. The method of fabricating the thin film transistor substrate as claimed in claim 9, wherein the protective film comprises an organic material that includes one of an acryl-group compound, a Teflon, a BCB, a Cytop and a PFCB.

12. The method of fabricating the thin film transistor substrate as claimed in claim 9, wherein the forming the first conductive pattern group includes simultaneously forming a lower common pad electrode and the first conductive pattern group on the substrate.

13. The method of fabricating the thin film transistor substrate as claimed in claim 12, wherein the forming the protective film includes forming a contact hole that passes through the gate insulating film and the protective film to expose the lower common pad electrode.

14. The method of fabricating the thin film transistor substrate as claimed in claim 12, wherein the forming the common electrode includes simultaneously forming an upper common pad electrode extended from the common electrode that covers the contact hole, and the common electrode.

15. The method of fabricating the thin film transistor substrate as claimed in claim 9, wherein the forming the second conductive pattern group and the semiconductor pattern includes simultaneously forming a lower common pad electrode and a semiconductor pattern overlapped under thereof, and the second conductive pattern group and the semiconductor pattern on the gate insulating film.

16. The method of fabricating the thin film transistor substrate as claimed in claim 15, wherein the forming the protective film includes forming a contact hole that passes through the protective film to expose the lower common pad electrode.

17. The method of fabricating the thin film transistor substrate as claimed in claim 15, wherein the forming the common electrode includes simultaneously forming an upper common pad electrode extended from the common electrode that covers the contact hole, and the common electrode.

18. The method of fabricating the thin film transistor substrate as claimed in claim 9, wherein the second conductive pattern group comprises a low-resistance metal that includes copper.

19. The method of fabricating the thin film transistor substrate as claimed in claim 9, wherein the common electrode is connected to a common pad that supplies a common voltage, the common pad including:
- a lower common pad electrode disposed on the substrate; and
- an upper common pad electrode connected, via a contact hole that passes through the gate insulating film and the protective film, to the lower common pad electrode and extended from the common electrode.

20. The method of fabricating the thin film transistor substrate as claimed in claim 9, wherein the common electrode is connected to a common pad that supplies a common voltage, the common pad including:
- a lower common pad electrode disposed on the gate insulating film; and
- an upper common pad electrode connected, via a contact hole that passes through the protective film, to the lower common pad electrode and extended from the common electrode.

21. The method of fabricating the thin film transistor substrate as claimed in claim 9, wherein the thin film transistor includes:
- a gate electrode connected to the gate line;
- a source electrode connected to the data line; and
- a drain electrode opposed to the source electrode,
- wherein the pixel electrode plate is directly disposed on the drain electrode.

* * * * *